United States Patent [19]
Kivilammi

[11] Patent Number: 5,518,362
[45] Date of Patent: May 21, 1996

[54] WIND POWER STATION

[76] Inventor: Anna E. Kivilammi, FIN-38950, Honkajoki, Finland

[21] Appl. No.: 256,572
[22] PCT Filed: Jan. 15, 1993
[86] PCT No.: PCT/FI93/00010
§ 371 Date: Jul. 18, 1994
§ 102(e) Date: Jul. 18, 1994
[87] PCT Pub. No.: WO93/14316
PCT Pub. Date: Jul. 22, 1993

[30] Foreign Application Priority Data

Jan. 17, 1992 [FI] Finland ............................ 920208

[51] Int. Cl.⁶ .............................................. F03D 7/06
[52] U.S. Cl. .................... 415/2.1; 415/4.1; 415/67
[58] Field of Search ................... 415/4.1, 2.1, 66, 415/67, 905

[56] References Cited

U.S. PATENT DOCUMENTS

| 763,795 | 6/1904 | Ravelli | 415/905 |
|---|---|---|---|
| 1,476,457 | 12/1923 | Miller | 415/66 |
| 5,007,241 | 4/1991 | Saitou | 415/66 |

FOREIGN PATENT DOCUMENTS

| 0083318 | 7/1983 | European Pat. Off. . | |
|---|---|---|---|
| 893164 | 6/1944 | France . | |
| 2472093 | 6/1981 | France . | |
| 0512909 | 11/1930 | Germany | 415/2.1 |
| 2719651 | 11/1978 | Germany | 415/2.1 |
| 2904559 | 8/1979 | Germany . | |
| 0248895 | 6/1926 | Italy | 415/66 |
| 0434427 | 4/1948 | Italy | 415/66 |
| 0110576 | 9/1981 | Japan | 415/2.1 |

Primary Examiner—F. Daniel Lopez
Assistant Examiner—Mark Sgantzos
Attorney, Agent, or Firm—Larson and Taylor

[57] ABSTRACT

A method and wind power station for the utilization wind energy and transformation of wind energy into electrical energy. The wind power station comprises several rotors rotating by wind energy and connected to electricity producing generators. From these rotors the wind stream is directed also to a separate, main rotor to thereby maximize the output from a given stream.

7 Claims, 2 Drawing Sheets

WIND POWER STATION

FIELD OF THE INVENTION

The invention relates to a method for transforming wind energy into electric energy. In the wind power station there are a number of rotors rotated by wind energy and coupled to function partly by the same wind steam.

BACKGROUND OF THE INVENTION

Wind power stations are previously known a.o. from Finnish Patent No. 11,121 and Application No. 863734. Further, in the USA and in Denmark wind power stations with 3-blade rotors are known, but the utilization of wind dynamics for producing electricity is poor in these stations.

SUMMARY OF INVENTION

By means of this inventive method and the wind power station a decisive improvement is achieved in this respect. The invention is characterized by the features described herein.

The most important advantages of the invention are that the wind steam is effectively guided in the right direction simultaneously to a number of rotors and the rotating wind stream of the lower rotors activates the rotation of the upper rotors and there are several generators connected to the rotors. The wind speed is raised before reaching the main rotor and transverse wind guiding plates at the blade tips can retain the wind and make the wind circulate along the blades in order to improve the efficiency of the wind power station.

BRIEF DESCRIPTION OF THE DRAWINGS

In the following the invention is presented in detail with reference to the enclosed drawings where

Like elements are provided with like numbers through the several views.

FIG. 1 shows a wind power station mounted on a base 1 on which it can turn by means of a slewing bearing at point 2. In the lower part of the wind power station frame 13 four superposed rotors 4 are arranged, which have a radial blade system 5. The rotors 4 have lateral axles fastened with bearings and which rotate clockwise. The rotational energy of the rotors 4 is utilized for production of electricity. The wind is directed to the rotors 4 by means of guiding plates, of which a part 6 is visible in this sectional illustration. Further, the wind stream is directed to the main rotor 8. The stream enters from an advantageous direction from channel 7 and turns the main rotor 8. Further, the main rotor 8 is rotated by direct wind and wind entering through a guide 12, the direction of which wind is also advantageous by means of this arrangement. The transverse wind guiding plates 10 at the tips of the rotor blades 9 can retain the wind and make the wind circulate along with the blades, thus activating the rotating of the rotor 8 and furthering the production of electricity by a generator 16.

Figure 1:
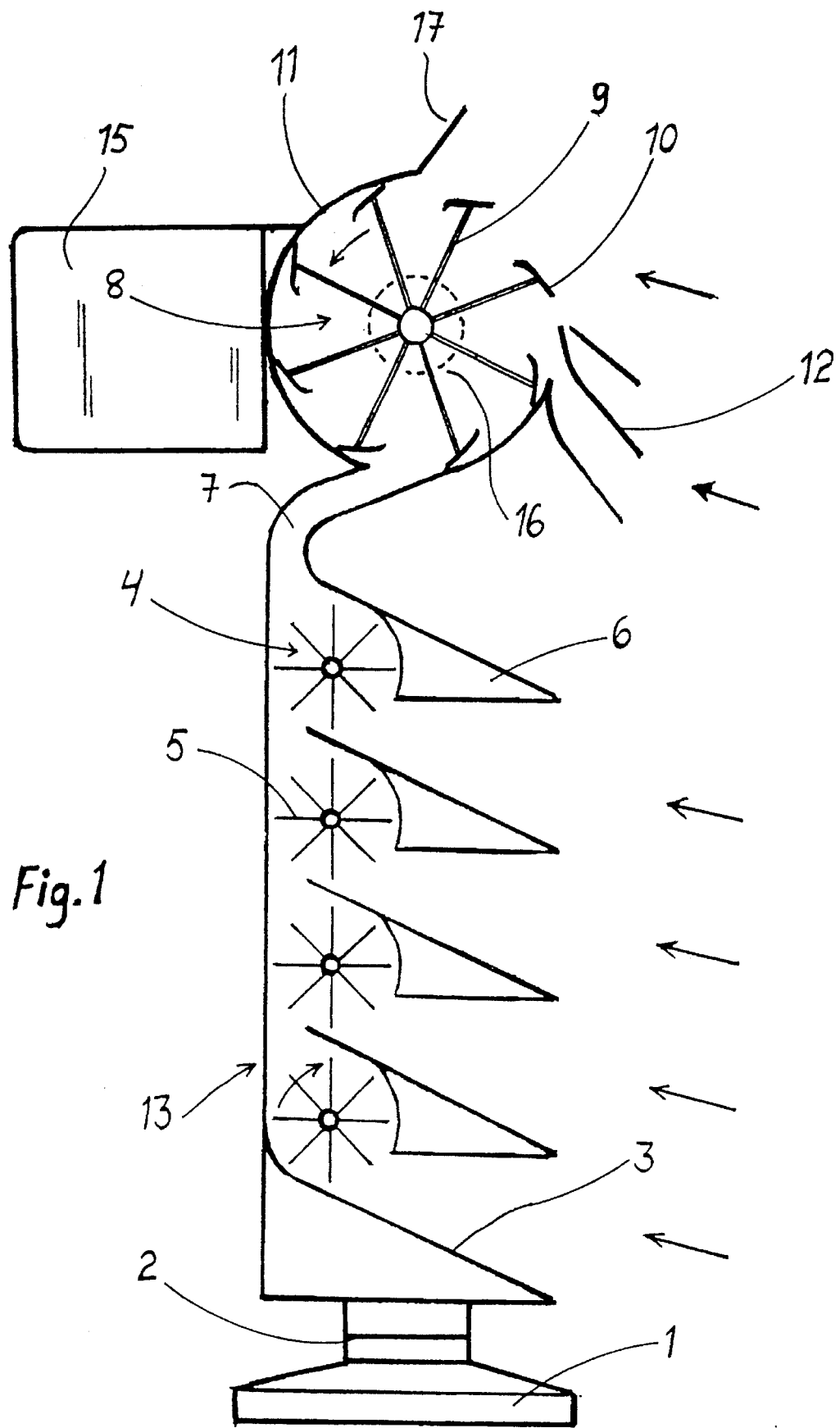
FIG. 1 is a side view of a wind power station.

Viewing from the wind direction, there is behind rotor 8 a raised aileron 17 and a plate bent in conformity with the rotor 8 to form a housing 11, which is substantially broader than blades 9. Casing 11 forces the wind to stream out from rotor 8 from one side of the rotor 8 and, further, the casing retains the wind stream, thus activating the rotation of rotor 8 and production of electricity of the generator 16. Also shown in FIG. 1 is a rudder 15 which function to keep the device facing the proper direction.

Figure 2:
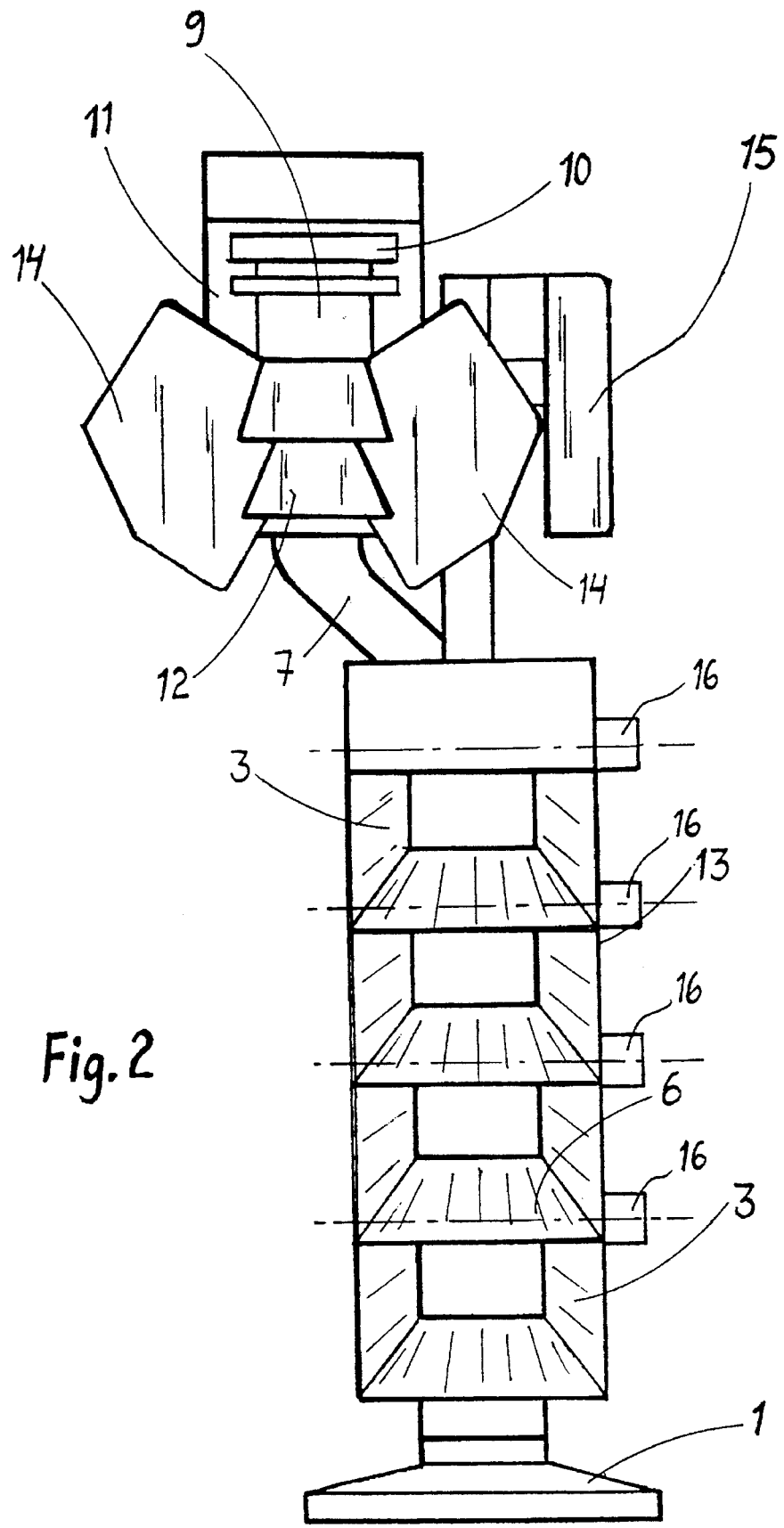
FIG. 2 is a front view of a wind power station.

FIG. 2 shows a wind power station from the front, whereat on the base 1 there is a lower part 13 with its four wind-guiding openings, which have side guides 3 and upper and lower guides 6. The upper part with the main rotor 8 is mounted on the lower part. The wind is turned to the main rotor 8 by side guides 14, which are arranged on both sides of the main rotor 8, and plates 12 in front of the rotor. From the upper side of the guides the wind has direct access to the rotor blade system. The back plate 11 is broader than blades 9. The main rotor 8 is arranged eccentrically with respect the wind power station pivoted vertical axle and a rudder 15 is placed on the opposite side to keep the device in the proper direction. The rudder 15 can also be replaced for instance by another parallel main rotor, whereby the device remains turned direct against the wind. At high wind speeds, e.g. over 15 m/s, in the power station one or several additional generators start up and there is no need to switch off the station in stormy weather.

FIG. 2 shows the generators 16. Some rotors can also have a joint generator. The generators and other electrical equipment of the wind power station can be advantageously realized by using previously known equipment.

The invention is not restricted to the disclosed embodiment but many modifications are possible within the limits of the inventive concept determined by the patent claims. The number of auxiliary rotors can be varied and the diameters of the auxiliary rotors can also increase gradually by getting higher.

I claim:

1. A method for the utilization of wind energy to transform wind energy into electrical energy in a wind power station which has a base on which the station is mounted for rotation about a vertical axis guided by a rudder affixed on said station, said station including several rotors each connected for rotation of a generator, the method comprising the steps of directing a direct wind stream to rotate both a main rotor and several superposed auxiliary rotors of the wind power station, and directing a second wind stream which results from the direct wind stream rotating said auxiliary rotors, through joint channel to rotate the main rotor.

2. A method according to claim 1 wherein the auxiliary rotors are superposed within a single vertical frame.

3. A method according to claim 1 wherein the main rotor has a periphery and the joint channel directs wind from the auxiliary rotors substantially parallel to the periphery of the main rotor.

4. A wind power station which is rotatable on its base according to the wind direction by means of a rudder fixed to the station frame, and which wind power station comprises a main rotor and several auxiliary rotors to transform wind energy into rotational motion, wherein the main rotor is rotated by a combination of a direct wind stream and a second wind stream directed to the main rotor which results from the direct wind stream rotating the auxiliary rotors, and wherein said auxiliary rotors are located below the main rotor and are also rotated by the direct wind stream.

5. A wind power station according to claim 4 wherein the main rotor includes a plurality of rotor blades having tips provided with lateral wind-guiding plates, which plates retain the wind and cause the wind to circulate along with the rotor blades to thereby convert the wind to rotational motion of the main rotor, and wherein the main rotor is connected to a generator for the production of electricity.

6. A wind power station according to claim 4 further comprising a back plate located on the leeward side of the main rotor and wherein said back plate is broader than the rotor blades of the main rotor.

7. A wind power station according to claim 4 further comprising one or more electricity-producing generators connected to one or more rotors selected from the main rotor and the auxiliary rotors.

* * * * *